United States Patent [19]

Tsurimoto et al.

[11] 4,395,175

[45] Jul. 26, 1983

[54] PROCESS FOR TREATING SCRAP ANODES AND APPARATUS THEREFOR

[75] Inventors: Hidetoshi Tsurimoto, Tanashi; Koichi Tokunaga, Funabashi, both of Japan; Martin K. Schonfeldt, Townsville, Australia

[73] Assignees: Mesco, Inc., Tokyo, Japan; Copper Refineries Pty. Ltd., Townsville, Australia

[21] Appl. No.: 206,805

[22] Filed: Nov. 14, 1980

[30] Foreign Application Priority Data

Nov. 20, 1979 [JP] Japan ................................. 54-149481

[51] Int. Cl.³ ............................................ B65G 57/08
[52] U.S. Cl. ..................................... 414/21; 198/477; 198/681; 414/31; 414/46; 414/55; 414/786
[58] Field of Search ................... 414/21, 31, 46, 54, 414/55, 56, 65, 66, 786; 198/403, 473, 477, 678, 681, 504, 774

[56] References Cited

U.S. PATENT DOCUMENTS

| | | | |
|---|---|---|---|
| 1,117,244 | 11/1914 | Richards | 414/31 |
| 2,944,655 | 7/1960 | Griswold | 414/45 |
| 3,225,942 | 2/1965 | Fossenier | 414/66 X |
| 3,451,532 | 6/1969 | Manterfield | 198/774 |
| 3,736,997 | 6/1973 | Bottorf | 198/774 X |
| 3,910,424 | 10/1975 | Kawahara | 414/76 |
| 4,020,944 | 5/1977 | Kojima et al. | 198/678 X |
| 4,069,925 | 1/1978 | Ahokas et al. | 414/69 |

Primary Examiner—Leslie J. Paperner
Attorney, Agent, or Firm—Flynn, Thiel, Boutell & Tanis

[57] ABSTRACT

A process and apparatus for treating or handling scrap anodes are disclosed, which process comprises the steps of transporting scrap anodes suspended vertically from a pair of rails with their shoulder portions mounted on said rails by means of pushing projections mounted on a chain conveyer at intervals and in a downwardly protruding manner, said rails being provided under said chain conveyer; thrusting up the lower ends of the scrap anodes by means of a rotating plate during this transportation so that said scrap anodes may take a nearly horizontal position, said rotating plate being disposed under the rails and adapted for rotating vertically; thereafter moving said scrap anodes onto a supporting means provided adjacent to the rails and adapted to move horizontally by a working cylinder; hereupon stopping the scrap anodes and separating said supporting means from the scrap anodes thereby allowing them to drop down while maintaining their nearly horizontal position; receiving them on a receiving stand; turning said receiving stand 180° in a horizontal plane; and thereafter lowering the receiving stand by a distance corresponding to the thickness of received scrap anodes by means of a lifting means.

17 Claims, 24 Drawing Figures

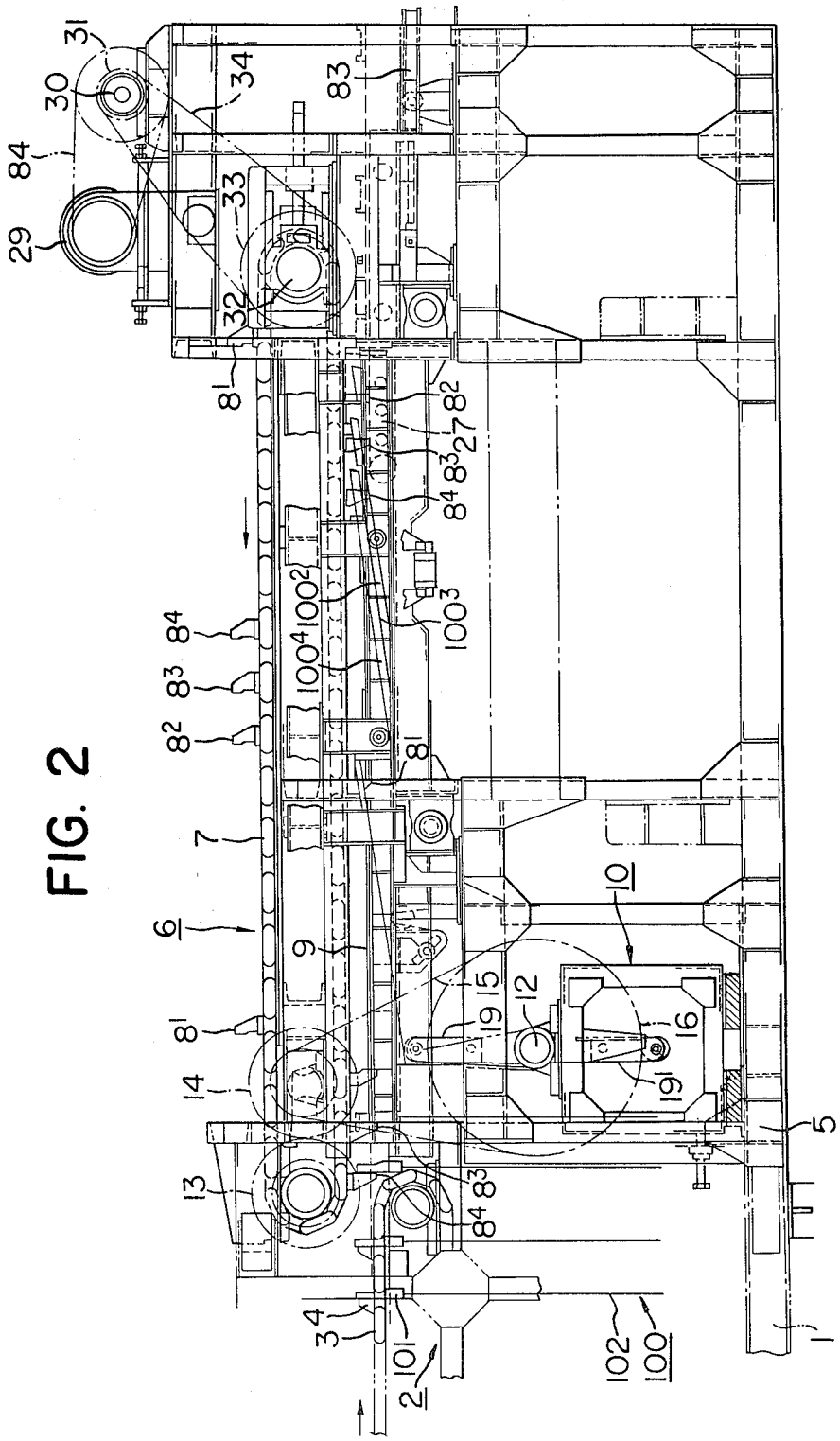

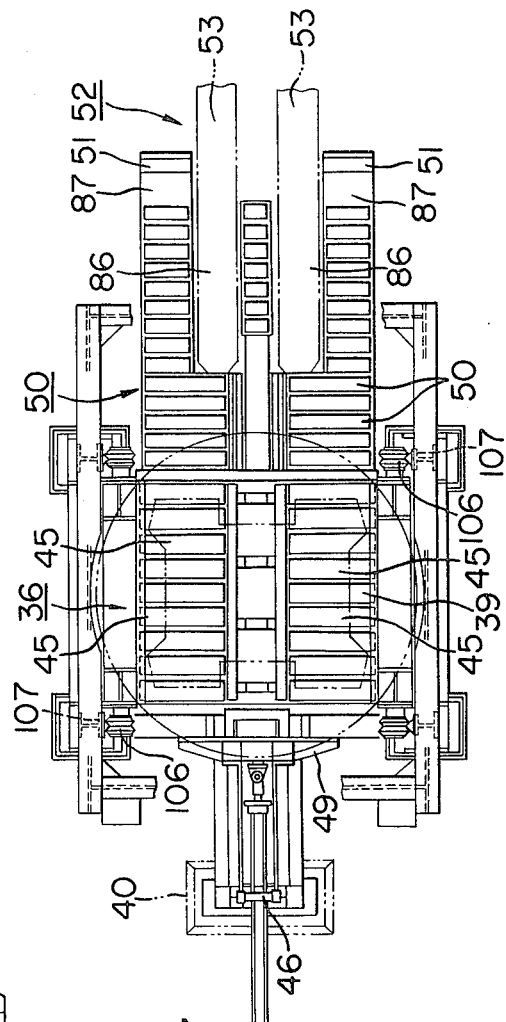
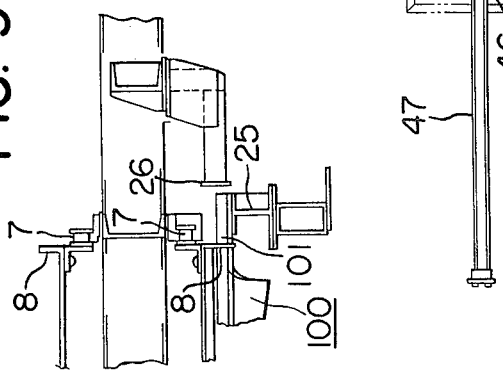

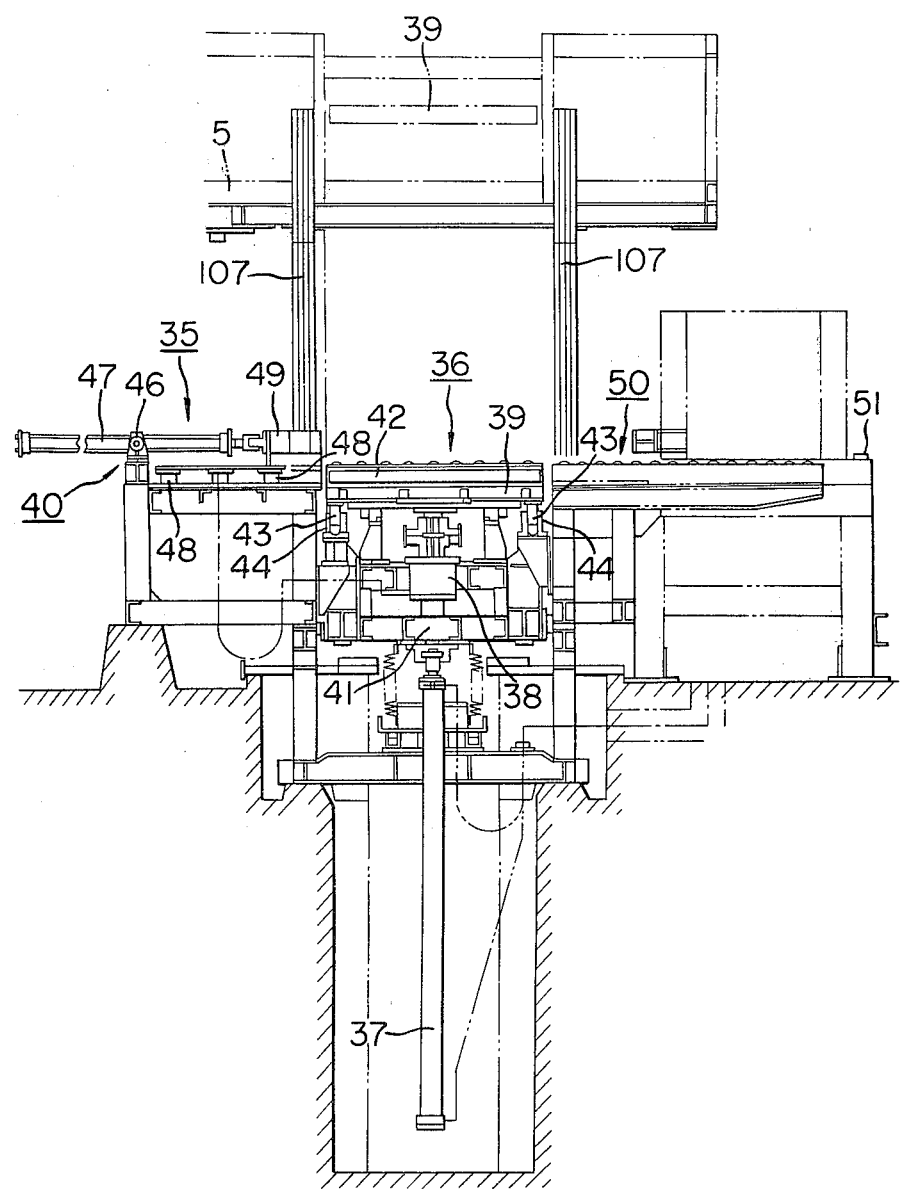

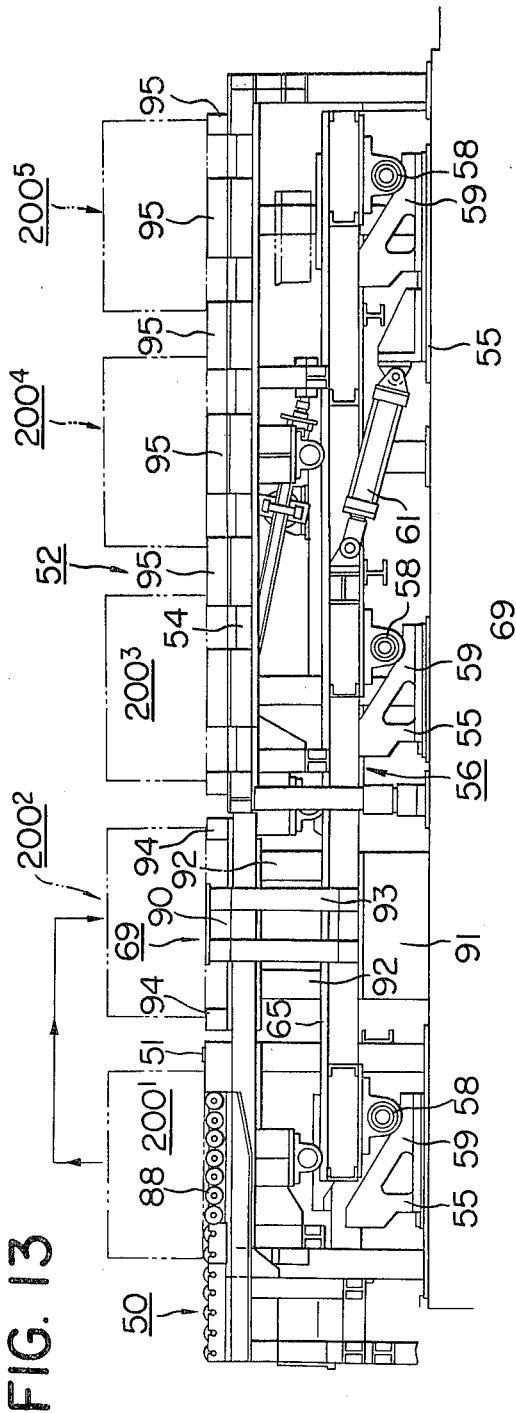

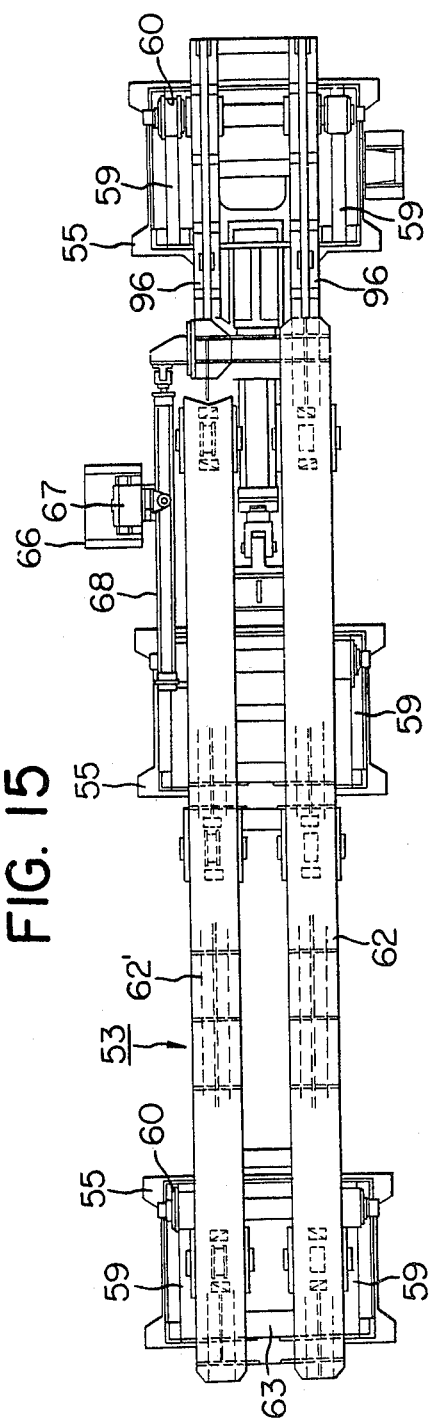
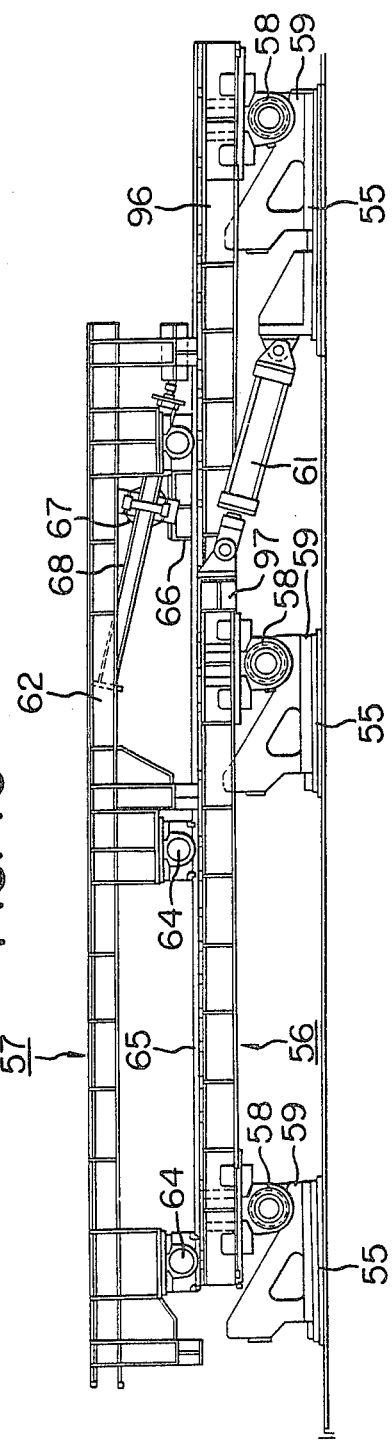

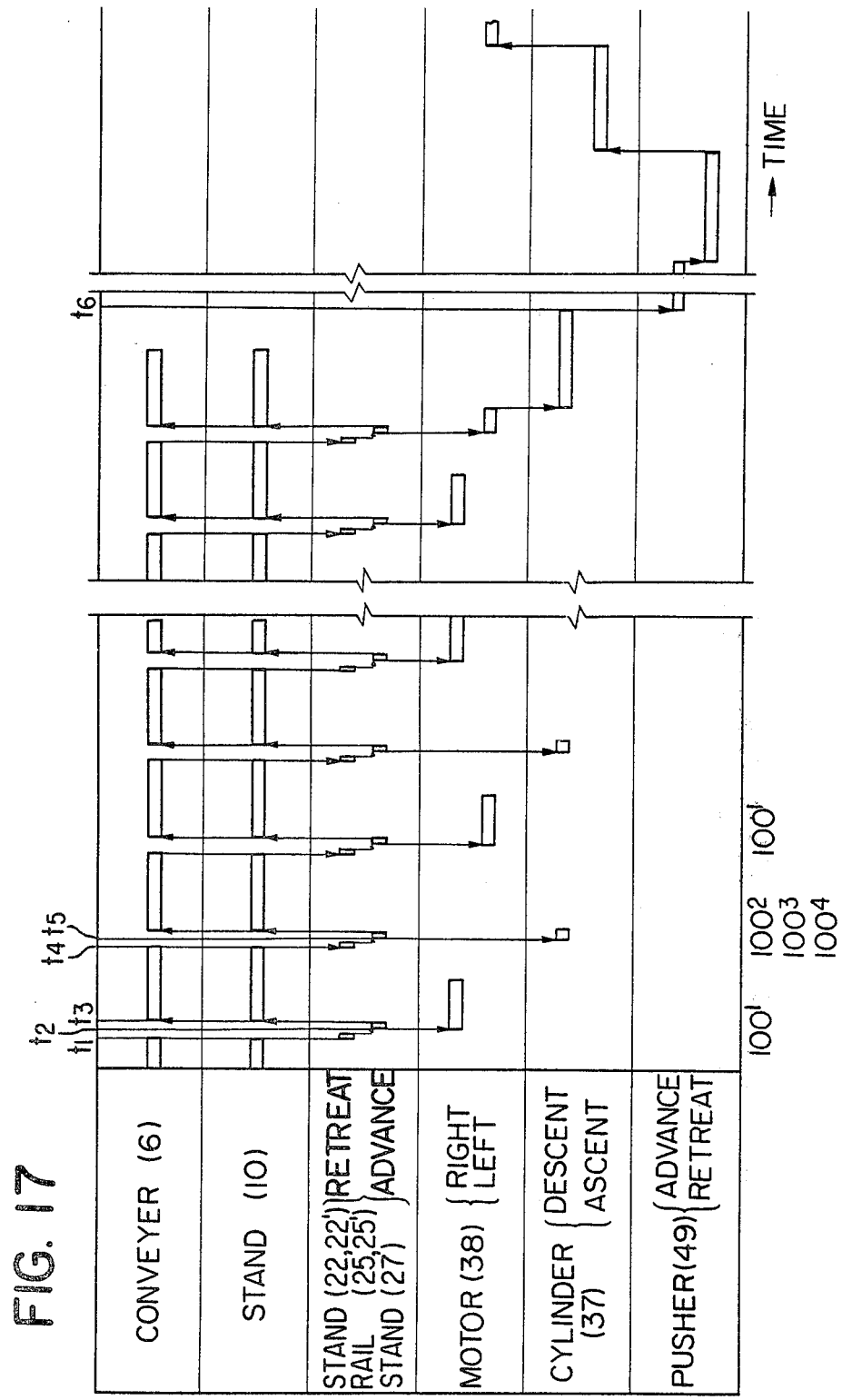

PROCESS FOR TREATING SCRAP ANODES AND APPARATUS THEREFOR

FIELD OF THE INVENTION

This invention relates to a process for treating or handling scrap anodes herein after referred to as "scrap" and an apparatus therefor.

BACKGROUND OF THE INVENTION

An anode plate used in electrorefining of non-ferrous metal consists of a barrel 102 which has thinned down after a given number of hours use, as seen from a scrap 100 illustrated in FIG. 1, because it is submerged beneath the electrolyte and dissolves therein during the electrorefining operation. The shoulder portions 101 still retain their initial thickness because they are not submerged beneath the electrolyte, wherein the barrel 102 is observed to retain its original outline as illustrated in the drawing, or be transfigured by vigorous dissolution thereof on occasions.

Thereafter, these scraps 100 are pulled out of an electrolytic cell, arranged and then charged in a dissolving furnace for regeneration. These scraps 100 are transported to a predetermined place while maintaining their perpendicular positions with both shoulder portions 101 thereof mounted usually on a chain conveyor or the like. Thereupon, these scraps are transported to the furnace in accordance with either of the following two ways and then charged into the furnace.

The first way comprises pushing a multiplicity of scraps 100 retained in a perpendicular state in an upper-opened trough-shaped container with their respective shoulder portions 101 suspended on the edge portions of the opening of the container, transporting these scrap-charged containers to the furnace by means of a fork lift and charging the scraps into the furnace.

The other way comprises allowing the scraps 100 to take a horizontal position, changing the orientation of every piece of scrap by 180°, transporting a predetermined number of thus piled up scraps to the furnace by means of a fork lift and then charging the scraps in the furnace.

In this connection, it is noted that the first way is defective in that when scraps are charged in the furnace the molten bath within the furnace is liable to be scattered over workers, and the furnace wall is liable to be damaged.

Referring to the second way, on the other hand, this method is noted to be defective because when the height of piled up scraps is increased the piled scraps are apt to suffer from deformation during the transportation, because the number of scraps to be charged in the furnace at one time through an inlet port provided at a fixed height of the furnace is limited, and the like.

SUMMARY OF THE INVENTION

An object of this invention is to provide a process for treating or handling scraps which is capable of eliminating the drawbacks inherent in the conventional processes and an apparatus therefor.

Another object of this invention is to provide a process for treating scraps and an apparatus therefor, which apparatus is used for transporting scraps, which have been thinned down through electrorefining and been piled up in a horizontal state, to a furnace, in a manner which prevents the deformation of scraps at their lower portions by supporting as well as thrusting up scraps at a nearly fixed place at the lower ends thereof when first transporting scraps in a perpendicular position by means of a conveyer and thereafter positioning them horizontally.

The aforesaid object can be achieved by this invention by transporting a plurality of scraps suspended vertically from a pair of rails with both upper end shoulder portions thereof mounted on the rails by thrusting the scraps using projections mounted on a conveyer disposed above the scraps, said rails being provided above a base, allowing the scraps to take a nearly horizontal position by thrusting up the lower ends thereof using a rotating plate disposed thereunder during this transportation, supporting thus positioned scraps by means of a horizontal supporting member, and thereafter dropping them down while maintaining their nearly horizontal position on a receiving stand disposed under said supporting member and adjacent thereto. In this case, since the rotating plate includes a guide plate which comprises a plate-like member mounted on a horizontal rotating shaft and provided with rollers at both ends and is designed so that the distance between the rotating shaft and rollers is adjustable, this invention is also advantageous in that the thrusting operation can be carried out smoothly by matching the length of the guide plate with the size of scraps.

A further object of this invention is to provide a process for treating or handling scraps and an apparatus therefor which are capable of reducing the height of piled up scraps in such a manner that plural scraps, transported in a perpendicular position, are placed in a horizontal position by supporting said scraps at a nearly fixed place of the lower end thereof to thus be piled up with a fixed displacement therebetween, and the end-to-end direction of sets of a fixed number of scraps is periodically reversed. This increases the number of scraps to be charged in the furnace at one time through an inlet port provided with a fixed height as the furnace and ensures safety of operation by preventing the occurrence of deformation of scraps during transportation and storage thereof.

The aforesaid object can be achieved by this invention in the manner of choosing the distance between projections mounted on the conveyer so as to correspond with the shift between piled up scraps, turning the receiving stand 180° in the horizontal plane when a certain number of scraps are received thereon, and lowering the receiving stand, when it has received a predetermined number of scraps thereon, by a distance corresponding to the thickness of received scraps. In this case, since the receiving stand, scraps received thereon and the supporting member are always located adjacent to each other, this invention is also advantageous in that the occurrence of displacement and damage on scraps can be prevented at the time of their dropping down.

A still further object of this invention is to provide a process for treating or handling scraps and an apparatus therefor which are capable of transferring a necessary number of scraps piled up on a receiving stand to weighing equipment adjacent thereto and weighing said piled up scraps by means of this equipment.

The aforesaid object can be achieved by this invention in the manner of crossfeeding the scraps piled up on the receiving stand, which has descended to its lowest position and stopped, by a crossfeeding member disposed at one side thereof to the upper face of a receiving member disposed on the other side thereof, and transferring the stationary scraps piled up on the upper face of the receiving member with transferring equipment to the weighing equipment adjacent to the receiving member. In this case, since the transferring equipment is devised to lift the scraps, piled up temporarily on the receiving member, up to a predetermined location, thereafter transfer the scraps horizontally toward the weighing equipment, lower the scraps from above the weighing equipment, and mount them on the weighing equipment, this invention is also advantageous in that the occurrence of probable deformation of piled scraps, transformation of the scrap and the like during said transfer can be prevented.

The other object of this invention is to provide a novel apparatus in which units and equipment are all designed to be controlled automatically by means of a controlling device and which is capable of treating or handling scraps, without help of manual operation, from the conveyer to the receiving stand or the weighing equipment by the action of a controlling element which has been previously incorporated in said controlling devices.

BRIEF DESCRIPTION OF THE DRAWING

In the drawings:

FIG. 2 is a side view of a part of one embodiment of the apparatus for treating scraps in accordance with this invention;

FIG. 9 is an enlarged sectional view taken on line IX—IX of FIG. 3.

FIG. 10 is a plan view of one embodiment of the receiving stand of the apparatus for treating scraps according to this invention.

FIG. 11 is a end view of the receiving stand illustrated in FIG. 10.

FIG. 13 is a side view of the same as illustrated in FIG. 12.

FIG. 14 is a sectional view taken on line XIV—XIV of FIG. 12.

FIG. 15 is an enlarged plan view of a movable portion of the apparatus illustrated in FIG. 12.

FIG. 16 is a side view of the same as illustrated in FIG. 15.

FIG. 17 is a time schedule table of the apparatus for treating scraps according to this invention.

DETAILED DESCRIPTION OF THE INVENTION

Figures 1A, 1B:
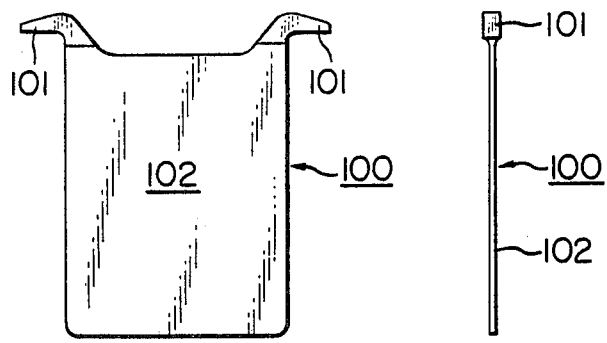
FIG. 1A is a front view of a scrap to be treated according to this invention.
FIG. 1B is a side view of said scrap.

Particularly, in FIG. 2, numeral 2 denotes a transporting chain conveyer mounted on a base 1 and arranged to move in the direction of the arrow. A pair of chains 3 of this conveyer 2 are provided with plural projections 4 at regular intervals. A scrap 100 is suspended in a nearly perpendicular state with both its shoulder portions 101 mounted on the chains 3, and the projection 4 abuts against this shoulder portion. Inside the chain 3 there are provided a pair of horizontal guide bars 71 substantially at the same level as and parallel to the chain 3, said guide bars being designed to receive te scrap 100 removed from the conveyer 2.

Figure 4:
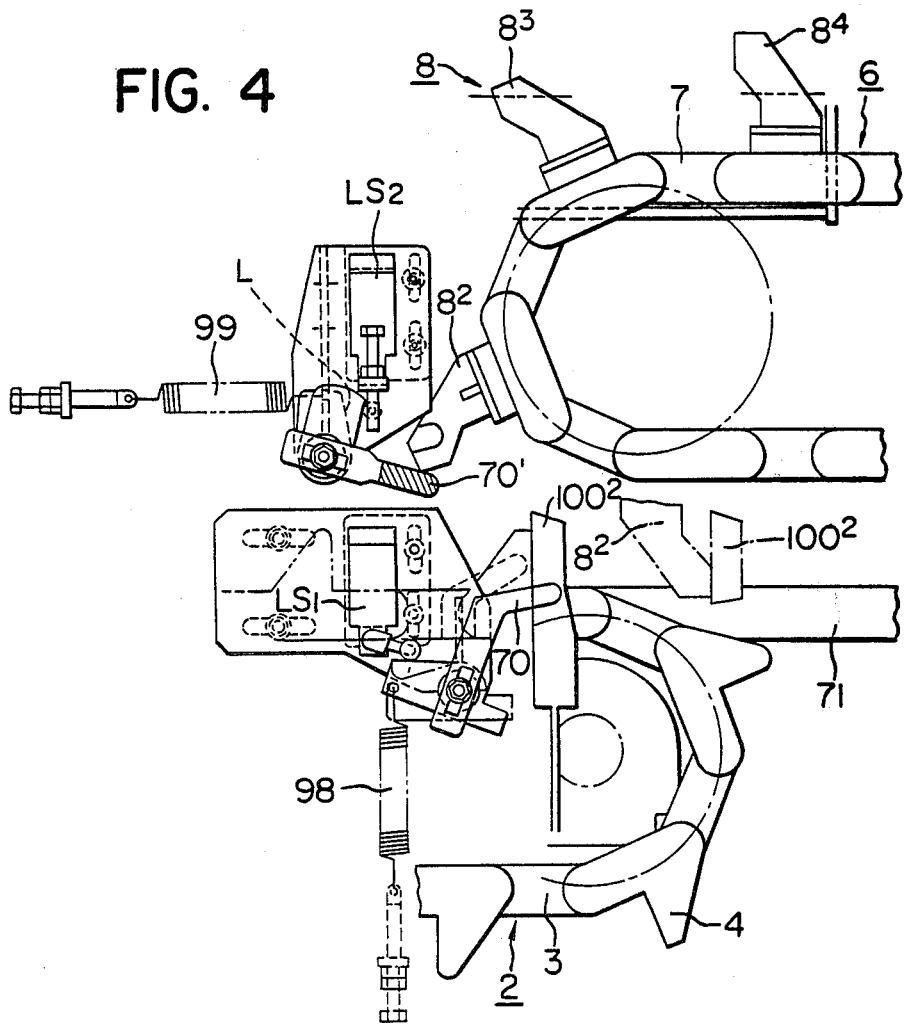
FIG. 4 is an enlarged side view of the scrap remaining part of the scrap transporting conveyer of the apparatus illustrated in FIG. 2 and the scrap intake part of the scrap transferring conveyer of the same.

The end portion of a chain conveyer 6 is located above the end portion of the conveyer 2 which, is mounted on a base 5 and orientated toward the same direction as the conveyer 2 (FIG. 4). This conveyer 6 moves in the direction of the arrow, and a pair of chains 7 thereof are provided with plural projections which are to be disposed at intervals determined in accordance with the number of scraps 100 to be piled up as described hereinafter.

The intervals to be left between the respective projections $8^1$, $8^2$, $8^3$ and $8^4$ are determined properly taking account of the conditions such as the number and direction of scraps 100 to be piled up, the longitudinal shift when scraps are piled up, and so forth.

The conveyer 6 is arranged to be driven by a motor 29 mounted on the base 5. This motor 29 rotates a shaft 30 through a chain 84, and sprockets 31, 31' rotate sprockets 33, mounted on a shaft 32 of the conveyer 6, through chains 34.

A pair of rails 9, 9' extending along the conveyer 6 are disposed under the conveyer 6 and on the extension line of the guide bars 71, and both shoulder portions 101 of the scrap 100 are mounted on the rails 9, 9'.

Figure 5:
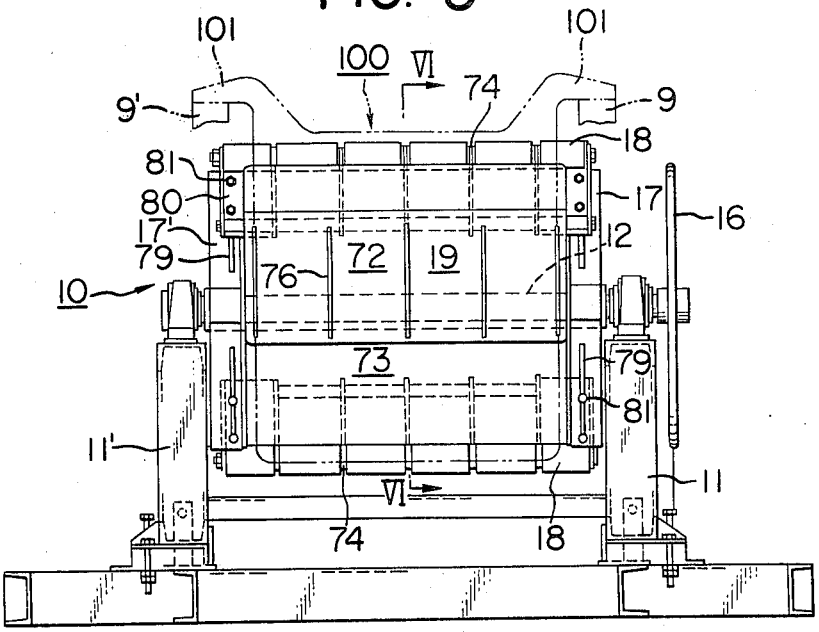
FIG. 5 is an enlarged end view of the rotating plate stand of the apparatus illustrated in FIG. 2.
Figure 6:
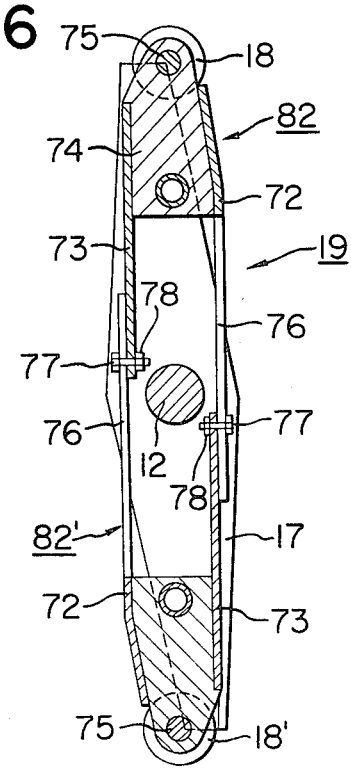
FIG. 6 is an enlarged longitudinal sectional side view of the guide plate of the rotating plate stand illustrated in FIG. 5.

A rotating plate stand 10 in FIGS. 5 and 6 is located at a place in the base 5 under the rails 9, 9'. This rotating plate stand 10 is provided with a pair of supporting stands 11, 11' aligned with both rails 9, 9' respectively and a shaft 12 mounted on said supporting stands 11, 11'which shaft 12 rotates in synchronism with the movement of the conveyer 6 because a sprocket 16 mounted on the shaft 12 for rotatably driving the shaft 12 is connected with the driven shaft of the chain conveyer 6 through a chain 15, a sprocket mounted on the shaft of a toothed gear 14, and a toothed gear 13 mounted on the driven shaft of the chain conveyer 6 and driving said toothed gear 14.

Guide supporting plates 17, 17' are fixed at the central portions adjacent to both supporting stands 11, 11' onto the shaft 12, and the supporting plates 17, 17' are provided with a guide plate 19. This guide plate 19, as is clearly seen especially from FIG. 6, takes a hollow box-like shape constructed by the combination of two guide members 82, 82'. Each of said guide members 82, 82' has fore and rear wall plates 72, 73 which are spaced from each other, disposed parallel to each other and different in length, these being connected together by means of longitudinal connecting plates 74, and shafts 75 passing through the connecting plates 74 are provided with rollers 18, 18' respectively. The wall plates 72 are provided with slits 76, and both sets of wall plates 72, 73 are fixed together by fixing bolts 77 in these slits 76 and then threading said bolts into nuts 78 mounted stationarily on the back surface of the wall plates 73. The guide plate 19, as seen from FIG. 5, is fixed in a slit 79 provided in the supporting plates 17, 17' by means of threaded bolts 81 threadedly engaged with nuts 80 provided on both sides of the guide plate 19. If bolts 77, 81 are loosened and both members 82, 82' are vertically moved in FIG. 6, the distance between rollers 18 may be controlled, and this distance is varied depending upon the length of scrap as occasion demands.

Figure 7:
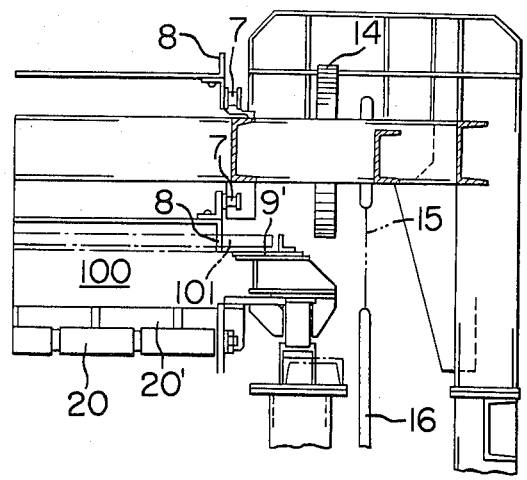
FIG. 7 is an enlarged sectional view taken on line VII—VII of FIG. 3.

The rollers 20, 20' located under both rails 9, 9' are, as seen from FIG. 7 in particular, mounted on the base 5 located ahead in the advancing direction of conveyer 6 (rightward in FIG. 2) while maintaining a fixed difference in height. In front of the rollers 20, 20', furthermore, there is provided a horizontal stationary carrying stand 21 at a height corresponding to that between the rollers 20, 20' and the rails 9, 9', and still further following this carrying stand 21 there are provided horizontal movable carrying stands 22,22' which project between both rails 9, 9' from the outside of both rails 9, 9' respectively.

Figure 8:
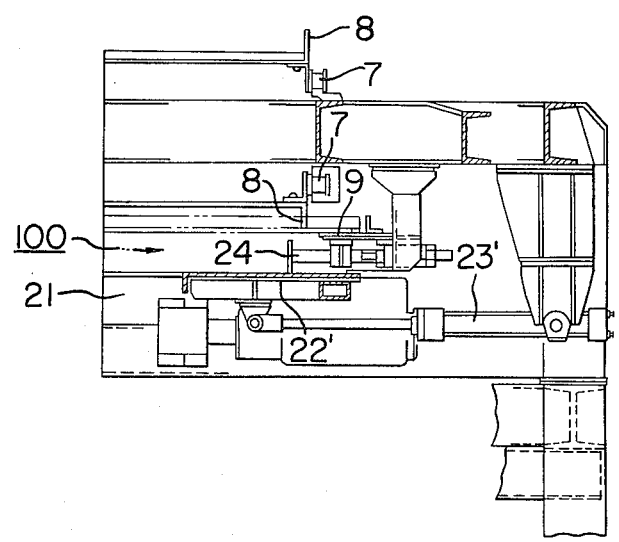
FIG. 8 is an enlarged sectional view taken on line VIII—VIII of FIG. 3.

These carrying stands 22, 22' are arranged to be movable between the projecting position indicated in FIG. 8 and the retracted position to the right in FIG. 8 formed between both rails 9, 9' by working cylinders 23, 23', and further at the upper part of each of the carrying stands 22, 22' is provided a stopper 24 for blocking the horizontal movement of the scrap. These stoppers 24 are designed to be always located at a fixed place irrespective of the positions taken by carrying stands 22, 22'.

In connection with the ends of both rails 9, 9' are disposed movable rails 25,25' (FIGS. 3 and 9) which are formed to be integral with each of the carrying stands 22, 22'. The upper portion of each of the movable rails 25, 25' is also provided stoppers 26 and 26' respectively, said stoppers playing a role similar to the stoppers 24.

Figure 3:
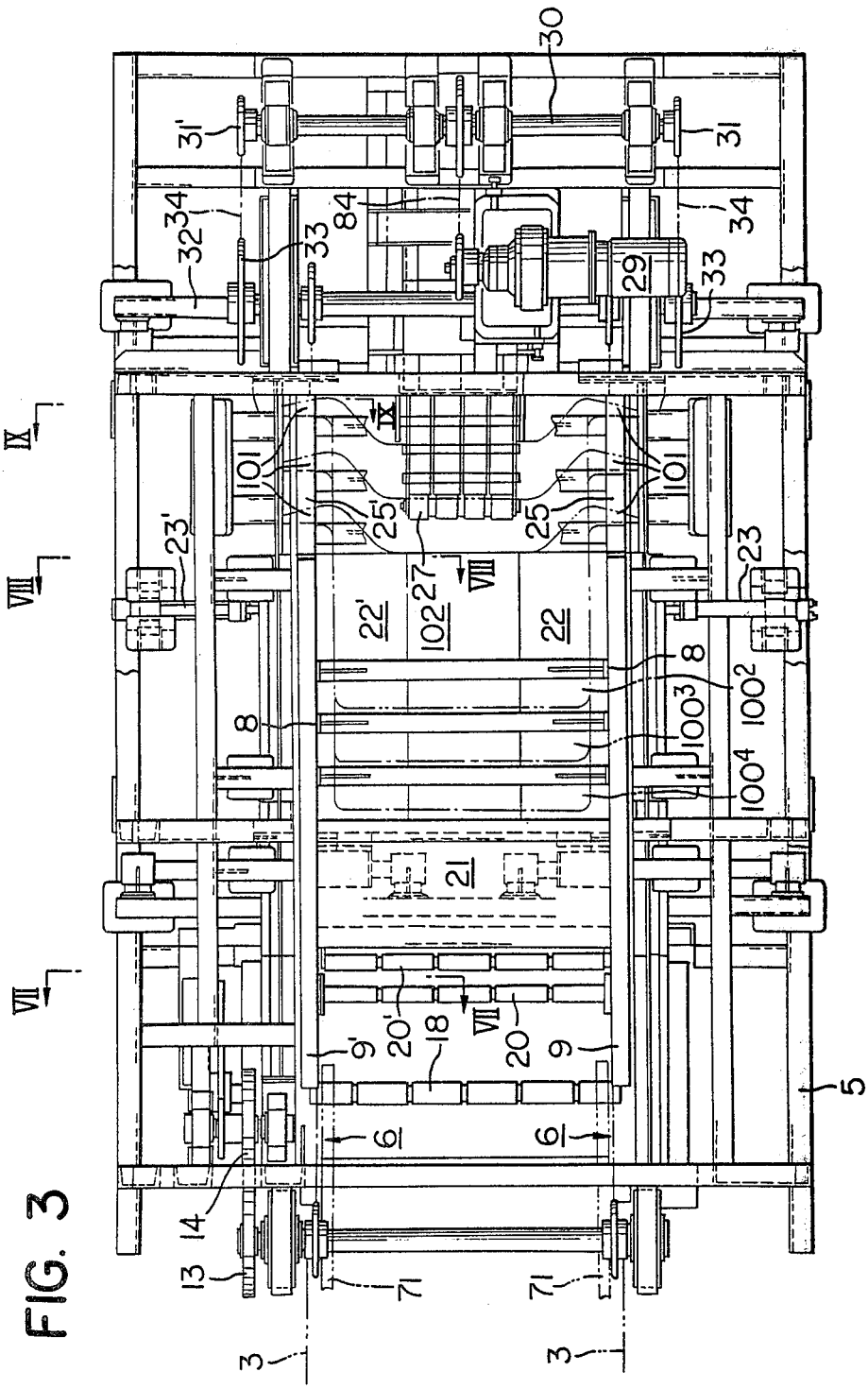
FIG. 3 is a plan view of the apparatus illustrated in FIG. 2.

Numeral 27 in FIG. 3 denotes a roller stand which serves to support the end portion of the scrap thereon and is designed to be movable horizontally between the place on the lower surface of the scrap in FIG. 3 and a rightward place not in contact with with the scrap by the action of a working cylinder 83 mounted on the base indicated in FIG. 2.

Beneath the above-constructed carrying stands 22, 22', movable rails 25, 25' and roller stand 27 in the base 5 there is provided a receiving stand 35 as shown in FIGS. 10 and 11. This receiving stand equipment 35 comprises an elevator means 36 and a crossfeeding means 40 disposed adjacent to this means 36. The elevator means 36 includes a lifting cylinder 37 provided thereunder, a rotating motor 38 mounted on its upper end through a connecting portion 41 and a stand 39 disposed above this motor 38.

The connecting portion 41 is provided at its four corners with rollers 106 respectively. These rollers 106 are designed to move along rails 107 upon the base.

On the upper surface of the stand 39 are provided a pair of channel-like guide members 42. These members 42 are positioned with their openings faced outwardly to each other, and provided with a conveyer 45 which comprises a plurality of rollers arranged sideways to each opening, respectively. This conveyer 45 is so designed that the rollers may freely rotate when the stand 39 is located at the lowest position as illustrated in FIG. 11 but otherwise their rotation is prevented by a stopping member not shown. The stand 39 has its under surface provided with projecting pins 43, while the stand has an opening into which said pin 43 is to be fitted when the stand 39 has descended to its lowest position and is provided with a receiving member 44 for blocking the movement of the stand 39 as a result of said fitting.

The crossfeeding means crosstransferring device 40 includes a working cylinder 47 mounted on the base through a bracket 46, a pusher 49 mounted on the end of the rod thereof and rollers 48 disposed under this pusher 49, each said roller 48 being so disposed that it may move within the an opening in the guide member 42 when the stand 39 is located at the lowest position.

On the side opposite to the crosstransferrring device 40 there is provided a roller conveyer 50 adjacent to the receiving stand equipment 35. This conveyer 50 is positioned at a height substantially equivalent to the conveyer 45 on the upper surface of its stand 39 when it is positioned at the lowest position. Two openings 86 are formed therein parallel to the transfer direction thereof. Two movable beams 53 to be described hereinafter are designed to be movable within the openings 86 vertically and horizontally. Numeral 51 denotes stoppers for stopping the scrap, which are provided at the rear end portion of each of the conveyer portions 87 disposed on both sides of the openings 86.

Weighing equipment (FIGS. 12 to 14) is provided adjacent to the conveyer 50. In this weighing equipment 69, receiving beams 89, 90 located on the extension line of each of the side conveyer portions 87 and central conveyer portion 88 of the conveyer 50 are mounted on a lower weighing member 91 through stanchions 92, 93, and further on the upper surface of the beam 89 are provided receiving members 94 at regular intervals, whereby the fork of an anode-transporting fork lift not shown may be inserted into the spaces formed between the receiving beams 90 and the receiving members 94.

Transporting equipment 52 is provided adjacent to the weighing equipment 69. Said transporting equipment includes a stationary beam means 54 and a movable beam means 53.

Figure 12:
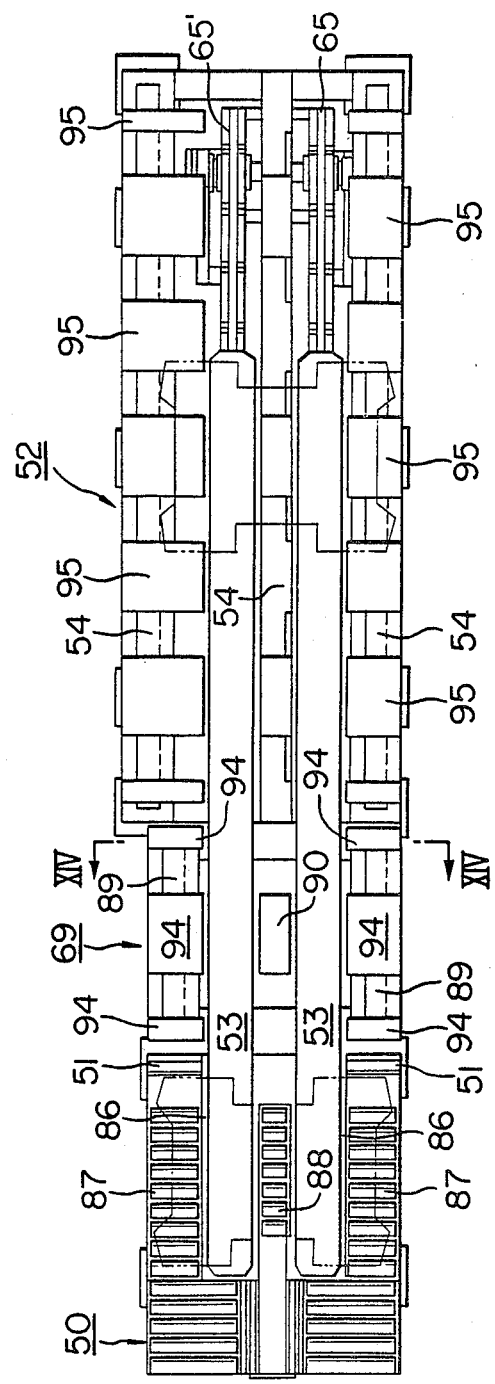
FIG. 12 is a plan view of one embodiment of each of the receiving stand, weighing equipment and transferring equipment of the apparatus for treating scraps according to this invention.

The stationary beam means 54, as shown in FIGS. 12 and 13, is located on the extension line of each of the receiving beams 89, 90 of the weiging device 69 and on the upper surface thereof are mounted receiving members 95 similar to the receiving members 94 for the same purpose as the members 94.

The movable beam means 53 is designed so as to be movable vertically and horizontally in a pair of parallel spaces extending in the scrap transferring direction through the conveyer 50, weighing equipment 69 and stationary beam means 54.

The above constructed movable beam means 53, as shown in FIGS. 15 and 16, includes a horizontal first beam means 56 which is arranged to reciprocate in the slant direction against the stand 55 and a second beam means 57 which is mounted parallel on the first beam and designed to reciprocate horizontally.

The first beam means 56 includes a pair of horizontal supporting beam members 96 and a coupling beam 97 for coupling these beam members 96. On the upper surface of the beam members 96 are provided rails 65, 65'. Between the rails 65, 65' and a connecting portion 67 mounted rotatably around a horizontal shaft on a base 66 there is provided a horizontally movable cylinder 68.

The second beam means 57 (FIGS. 15 and 16) includes a pair of carrying beams 62, 62' and a coupling beam 63 for coupling the beams 62, 62' together, and rollers 64 provided on the lower surface thereof are located on the rails 65, 65' provided on the upper surface of the first beam 56. The side portions of the other beam 56 supported by three pairs of rollers 58, provided on another base, locating respectively on slant rails 59 provided on plural base stands 55. A pair of flanges 60 (FIG. 5) are formed on the peripheral surface of one of each pair of rollers, which flanges prevent the rollers from derailing. A lifting cylinder 61 is provided between one of the base stands 55 and the lower end of the first beam 56.

OPERATION

The operation of the above mentioned apparatus will be explained with reference to the time schedule of operation illustrated in FIG. 17 hereinafter.

When a leading scrap $100^2$ is transported in the state of being suspended with both shoulder portions 101 on the chain 3 of the conveyer 2 and while allowing the projection 4 provided in the chain to thrust the rear surface thereof, as seen from FIG. 4, a working piece 70 provided on the base located on the side portion of the conveyer 2 is thrown down as shown with a solid line against the tensile force of a spring 98 to thereby actuate a limit switch $LS_1$.

The conveyer 2 is stopped by the actuation of this switch $LS_1$, and at the same time the conveyer 6 begins to move. The engaging of the projection $8^2$ with the working piece 70' provided on the base located on the side portion of the conveyer 6 is thus released, said working piece 70' is moved by the tensile force of a spring 99 to the position indicated by a dotted line L and the limit switch $LS_2$ which has stopped the conveyer 6 is released.

The projection $8^2$ further advances to thereby thrust the rear surface of the scrap $100^2$ stopped at the position indicated with a solid line and move the shoulder portions 101 of the scrap onto the guide bar 71 for suspending purposes. The scrap $100^2$, having taken a vertically suspended position, is advanced along this bar 71 up to the position indicated with broken lines. The scrap $100^2$ is thus separated from the working piece 70. The working piece 70 is thus pulled by the spring 98 and restored to the position indicated with a dotted line, whereby the switch $LS_1$ is released to advanced the conveyer 2. On the other hand, the next projection $8^3$ engages the working piece 70' to thereby restore this to the position indicated with a solid line, whereby the conveyer 6 is stopped by the action of the switch $LS_2$.

Figure 18:
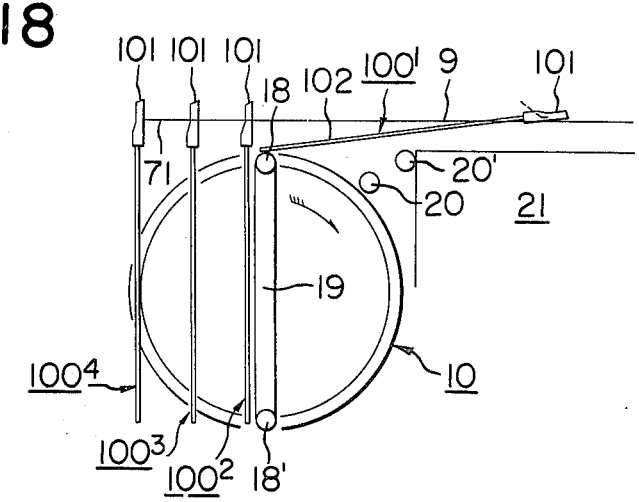
FIGS. 18 to 22 are views illustrating the operation sequence of the rotating plate stand of the apparatus for treating scraps according to this invention.

The scrap $100^2$, transported intermittently while maintaining a perpendicular position along the guide bar 71 by the above-mentioned moving action of the conveyer 6, is allowed to approach the rotating plate stand 10 and move, as in the case of scrap $100^2$ indicated in FIG. 18, to the position adjacent and parallel to the guide plate 19, and is successively converted into a horizontal state by the action of the guide plate 19 rotating synchronously with the conveyer 6.

FIGS. 18 to 21 illustrate variations in conditions during this process, wherein reference is made to three pieces of scraps $100^2$, $100^3$ and $100^4$. The action of scrap $100^1$ is identical with that of $100^2$ except that scrap $100^1$ is not piled up with scraps $100^3$ and $100^4$ at the lower ends thereof as described below. Therefore, both will be explained simultaneously.

Figure 19:
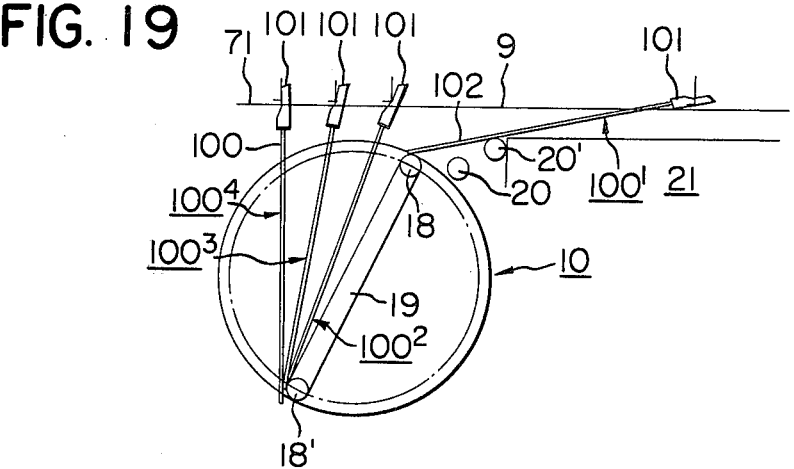

When the scrap $100^2$ ($100^1$) arrives at this position, owing to its advancing movement and the rotation of the guide plate 19, it is piled together with the lower portions of other scraps $100^3$ and $100^4$ and the lower end of scrap $100^2$ ($100^1$) is supported by the roller 18' as shown in FIG. 19.

Figure 20:
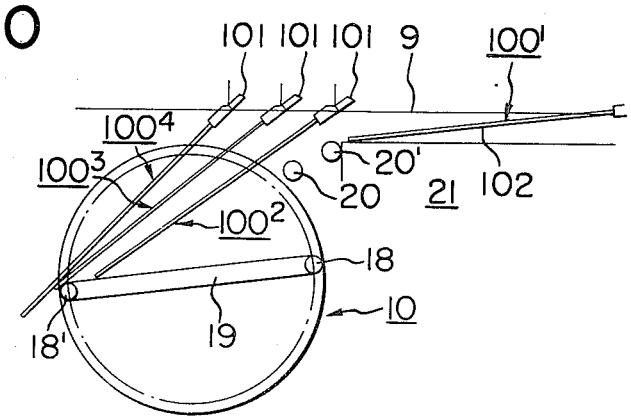
Figure 21:
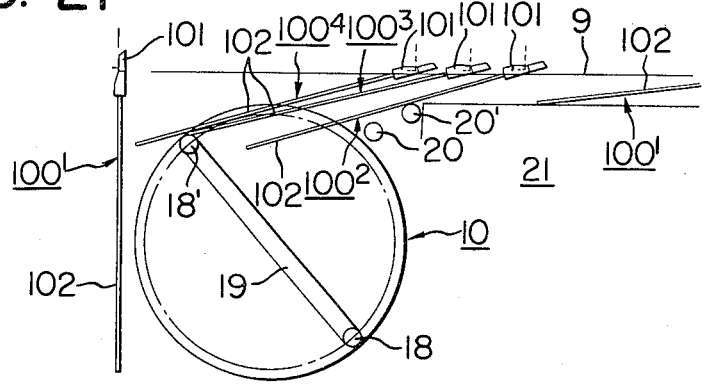
Figure 22:
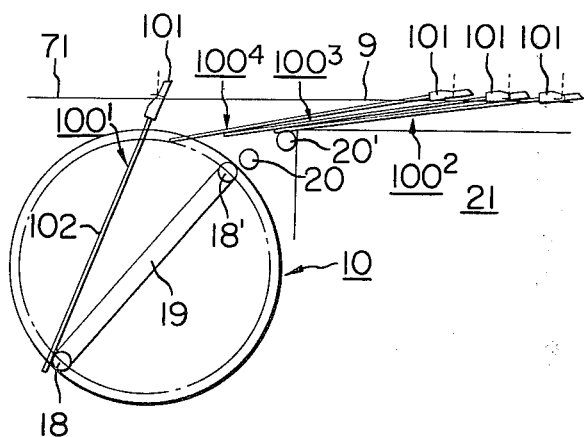

Then, the lower end of scrap $100^2$ ($100^1$), as shown in FIG. 20, moves onto the guide plate 19, while the lower end of scrap $100^3$ is supported by the roller 18' and the lower end of scrap $100^4$ is overlapped thereon. Then, the lower end of scrap $100^2$ ($100^1$) is separated from the guide plate 19, and simultaneously its barrel 102 slides on rollers 20, 20' into the state as illustrated in FIG. 21, while the lower portions of scraps $100^3$ and $100^4$ are still supported by the roller 18' while maintaining their overlapped state. This state continues until just before the state illustrated in FIG. 22. Thereupon, the lower portions of scraps $100^3$ and $100^4$ are separated from the roller 18', resulting in the state illustrated in FIG. 22.

At that time, the lower ends of scraps $100^3$, $100^4$ or the lower end of scrap $100^4$ come to overlap the lower end of $100^2$ or the lower end of scrap $100^3$, respectively but their overlapping portions are so narrow that there is no fear of the upper scraps $100^3$, $100^4$ or $100^4$ bending the lower scraps $100^2$ or $100^2$, $100^3$, respectively. Due to this, there is no possibility of problems in the course of subsequent operation.

After three pieces of scraps $100^2$, $100^3$ and $100^4$ have thus been put in a horizontal position, the next scrap $100^1$ approaches the rotating stand 10. Thereat, the guide plate 19 has turned 180° to thereby produce the positional relation between scrap $100^1$ and the guide plate 19 similar to that indicated in FIG. 18 with the exception that the distance between projections $8^1$ and $8^4$ is determined so that the upper and lower positional relation may be reversed between rollers 18 and 18'. This distance is entirely applicable to that between projections $8^1$ and $8^2$.

Thus, the scrap $100^1$ is allowed to take a nearly horizontal position and arrive at a position where its shoulder portions 101 are mounted on rails 25, 25' in the exactly same manner as indicated in FIG. 3 with reference to scrap $100^2$ and the barrel 102 is supported by the carrying stands 22, 22' and roller 27.

In such a state, a limit switch (not shown) mounted on the base is actuated by the scrap $100^1$, whereby all the conveyers 2, 6 are stopped (FIG. 17, tL). At the same time, cylinders 23, 23'; 83 are actuated to retreat the carrying stands 22, 22', movable rails 25, 25' and roller stand 27, and consequently scrap $100^1$ drops down while maintaining its horizontal state. In this case, the action of stoppers 24, 26 allows scraps to drop down always into a fixed area. The scrap $100^1$ thus dropped down is received in a horizontal position on the receiving stand 39 disposed thereunder (FIG. 23).

In FIG. 17, at t2 after the lapse of the required time a timer (not shown) is actuated so that the respective members 22, 22'; 25, 27 are allowed to advance, and at the same time the rotating motor 38 is actuated to turn the receiving stand 39 180° clockwise. As soon as the respective members 22, 22'; 25, 25'; 27 advance and restore their original positions, the conveyor 6 and rotating plate stand 10 begin to operate (t3), and midway of its operation the receiving stand 39 completes its rotation and stops.

Figure 23:
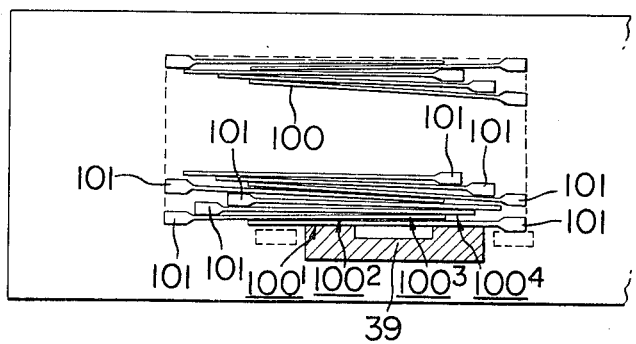
FIG. 23 is a view illustrating the state of a pile of scraps on the receiving stand of the apparatus for treating scraps according to this invention.

Subsequently, the following scraps $100^2$, $100^3$ and $100^4$ arrive at their positions where they are to be supported on the respective members 22, 22'; 25, 25'; 27 (t4), and are piled up on the receiving stand 39 in the same manner as aforesaid and in the direction opposite to scrap $100^1$ (FIG. 23). In this instance, there is no fear of the mutually adjacent thick shoulder portions 101 overlapping because said scraps are piled up with their end edges shifted from each other. This shift can be obtained by the choice of distances between projections 8 of the conveyor 6.

At t5 after the lapse of the time required for dropping, the respective members 22, 22'; 25, 25'; 27 advance and the conveyor 6 and rotating plate 10 begin to operate in the same manner as aforesaid with the exception that the rotating motor 38 does not rotate and instead the cylinder 37 operates to lower the receiving stand 39 at a distance corresponding to the total thickness of scraps $100^1$, $100^2$, $100^3$ and $100^4$.

By repeating this, as shown in FIG. 23, there can be obtained sets in the pile of scraps, each set comprising 4 scraps piled in each direction respectively, wherein the piling operation is effected in such a manner that three scraps directed leftwards $100^2$, $100^3$ and $100^4$ are piled on one scrap directed rightwards $100^1$, another four scraps are piled thereon which comprise one scrap directed leftwards $100^1$ and three scraps directed rightwards $100^2$, $100^3$ and $100^4$ piled up thereon, and so on.

A plurality of scraps thus piled up horizontally can easily be charged into the furnace because they are shifted in a horizontal direction without being piled at their thick shoulder portions 101 and thus the height of the pile of scraps can be reduced, and further can be transported, stored and the like with safety because they cause deformation only with difficulty.

When a predetermined number of scraps are piled up on the receiving stand 39 in the aforementioned manner, the receiving stand 39 reaches the lowest position indicated by a solid line in FIG. 11 by the action of the cylinder 37 and stops. At this time, the pins 43 mounted on the under surface of the receiving stand 39 fit in the receiving members 44 of the base, thereby holding the receiving stand 39 in a stable state.

When the receiving stand 39 attains its lowest position (FIG. 17,t6), the working cylinder 47 is actuated so that the pusher 49 advances while fitting the rollers 48 in the grooves 42 of the receiving stand 39 and pushes forward the scrap block located on the upper surface of the receiving stand 39 until said block is stopped by the stopper 51 on the roller conveyor 50 provided between the receiving stand and the weighing device 69, and thereafter the receiving stand 39 is allowed to restore its highest position as well as rotate by the action of the cylinder 37 and motor 38 to thereby prepare for receiving scraps to be dropped successively. Thus, the scrap block comes to be located at a position $200^1$ (FIG. 13) on the conveyor 50.

At the same time, the transporting device 52 starts its operation for weighing the scrap block. In more detail, the lifting cylinder 61 starts its advancing operation, whereby the first beam 56 moves left-and upwardly along inclined rails 59, 59' while retaining its horizontal position. The second beam 57 is also inclined to move integrally with the movement of this first beam 56, said second beam being so arranged that the rollers 64 provided on its lower end are located on rails 65, 65' provided on the upper surface of the first beam. However, as the horizontal movement cylinder 68, installed between this second beam 57 and the base 66 provided on the outside, acts at this time to block the movement of the second beam 57 in the horizontal direction, the movement of the first beam 56 in the horizontal direction at the time when said beam has moved leftwardly and upwardly on a slant is canceled out by the rightward movement of the second beam 57 relative to the first beam 56, whereby the second beam 57 ascends only in the perpendicular direction.

Accordingly, the scrap block, which has been stopped at position $200^1$ on the conveyor 50 by the stopper 51, ascends, as indicated with the arrow in FIG. 13, in the state of having been received on the upper surface of the carrying beams 62, 62' of the second beam 57 which ascends vertically with the slanting upward movement of the first beam 56.

After the lifting cylinder 61 has completed the ascending step and halts, the cylinder 68 connected to the second beam 57 operates, whereby the second beam 57, having the scrap block mounted thereon, moves rightwards in the horizontal direction indicated with the arrow along the upper surface of the first beam 56 and thereafter the cylinder 68 stops the movement of the second beam 57. Thereafter, the cylinder 61 retreats, and therefore the second beam 57 descends vertically as the first beam 56 moves right-downwardly, and concurrently the scrap block descends as indicated with the arrow in FIG. 13, and is located at a position $200^2$ on the receiving beam 90 and receiving member 94 of the weighing equipment 69 for weighing purposes.

After the first beam 56 moves still more right-downwardly and stops at its original position, the cylinder 68 this time operates in the opposite direction thereby to allow the second beam 57 to move leftwards and to restore its original position.

The scrap block weighed as aforesaid is transferred, by the same operation of the transporting equipment 52, to the position $200^3$ on the receiving members 95 mounted on the stationary beam 54 adjacent to the transporting equipment, and thus is transferred to the positions $200^4$ and $200^5$ on the stationary beam 54 successively. The scrap block, located on the weighing equipment 69 or stationary beam 54, is received by a fork lift (not shown) in the manner of inserting the fork in the spaces formed between receiving members 95 and transported to the furnace.

As will be seen from the aforegoing, explanation was made on the instance wherein a set comprises four scraps. However, it is to be noted that this number is cited only by way of example and therefore other set sizes naturally may be employed. Further, it is to be noted that in the practice of the aforesaid operation it is intended to use controlling means other than those illustrated in the drawing widely used in the electric automatic controlling field such as a limit switch, timer and the like and achieve the required operations by means of controlling circuits incorporating aforesaid means therein.

Although particular preferred embodiments of the invention have been disclosed hereinabove for purposes of illustration, it will be understood that variations or modifications thereof which lie within the scope of the invention as defined by the appended claims are fully contemplated.

What is claimed is:

1. A process for handling scrap anodes, comprising the steps of:

suspending a plurality of scrap anodes vertically from a pair of rails, provided at the upper portion of a base, with both upper shoulder portions of each of said anodes mounted on said rails;

transporting said scrap anodes arranged at regular intervals, while maintaining their vertical position, by means of abutting projections mounted on a conveyer at regular intervals and in a downwardly protruding manner, which projections abut against and push the upper end rear portions of said scrap anodes, said conveyor being disposed above said rails;

thrusting up the lower ends of said scrap anodes by means of a rotating plate during this transportation so that said scrap anodes assume a nearly horizontal position, said rotating plate being disposed under the rails and adapted for rotating vertically;

thereafter moving said scrap anodes onto supporting means provided adjacent to the rails and adapted to move horizontally;

hereupon stopping all the scrap anodes and separating said supporting means from the scrap anodes, thereby allowing the suspended scrap anodes to drop down while maintaining their nearly horizontal positions;

receiving said anodes on a receiving stand disposed under the supporting means;

rotating said receiving stand horizontally through a predetermined angle in the horizontal plane;

thereafter lowering said receiving stand by a distance corresponding to the thickness of the received scrap anodes; and forming a scrap anode pile on said receiving stand by repetition of the aforementioned steps.

2. A process for handling scrap anodes comprising the steps of:

suspending a plurality of scrap anodes vertically from a pair of rails, provided at the upper portion of a base, with both upper shoulder portions of each of said anodes mounted on said rails;

transporting said scrap anodes arranged at regular intervals, while maintaining their vertical position, by means of abutting projections mounted on a conveyor at regular intervals and in a downwardly protruding manner, which projections abut against and push the upper end rear portions of said scrap anodes, said conveyor being disposed above said rails;

thrusting up the lower ends of said scrap anodes by means of a rotating plate during this transportation so that said scrap anodes assume a nearly horizontal position, said rotating plate being disposed under the rails and adapted for rotating vertically;

thereafter moving said scrap anodes onto supporting means provided adjacent to the rails and adapted to move horizontally by working means;

hereupon stopping all the scrap anodes and separating said supporting means from the scrap anodes, thereby allowing the suspended scrap anodes to drop down while maintaining their nearly horizontal position;

receiving said anodes on a receiving stand disposed under the supporting means;

rotating said receiving stand horizontally through a predetermined angle in the horizontal plane by rotating means;

thereafter lowering said receiving stand by a distance corresponding to the thickness of received scrap anodes by vertical movement means;

forming a scrap anode pile on said receiving stand by repetition of the aforementioned steps;

pushing said pile of scrap anodes off said receiving stand onto transporting equipment provided on a side of said receiving stand by the action of cross-stransferring means; and transporting said pile of scrap anodes towards the upper portion of weighing equipment by the action of movable beam means capable of moving vertically as well as horizontally.

3. A process as claimed in claim 2, wherein said receiving stand is rotated only through angles of 0° and 180°, such that said pile comprises a plurality of scrap anodes, the upper shoulder portions of which are disposed lengthwise on only two sides of said pile.

4. A process as claimed in claim 3, wherein said scraps are piled in sets comprising a certain number of said scraps, each scrap in a particular set having its upper shoulder portion on the same side of said pile as the other scraps in said set, and such that none of the upper shoulder portions of the scraps in a particular set overlap each other.

5. An apparatus for handling scrap anodes, each of which has a barrel, comprising:

an endless conveying means comprising a pair of upper and lower strips having projections for engaging scrap anodes disposed thereon at regular intervals, said conveying strips being disposed in parallel and at regular intervals from each other;

a pair of fixed rails disposed parallel to and under said conveying strips and along the moving direction thereof adapted to have scrap anodes hang therefrom by their upper end shoulder portions, said scrap anodes being pushed along said rails by said projections of said lower strip;

a pair of movable rails disposed following said pair of fixed rails, which movable rails are adapted to move reciprocally in a horizontal direction, which movable rails receive scrap anodes from said fixed rails, said anodes being pushed along said movable rails by said projections of said lower strip;

supporting means for supporting the barrels of the scrap anodes disposed between said movable rails, under said endless conveying strips, and designed to be reciprocally movable horizontally;

working means for moving said supporting means horizontally;

a vertically rotatable rotating plate disposed under said pair of fixed rails and connected through drive-transmitting means with said endless conveying means, said rotating plate being arranged to support the scrap anodes at their lower ends and adjust the scrap anodes to a nearly horizontal position by lifting, in proportion to their movement, the lower ends of said scrap anodes each being suspended by both upper end shoulder portions thereof;

a horizontally rotatable receiving stand disposed under said supporting means and being adapted to ascend and descend between an upper no load position and a lower full load position, as well as rotate horizontally;

lifting means for causing said receiving stand to ascend and descend between the no load position and the full load position;

rotating means for rotating said receiving stand in a horizontal plane; and controlling means for controlling the operations of the aforesaid respective means, said controlling means being constructed so that said conveying strips and rotating plate are operated thereby to move the scrap anodes to a substantially horizontal position during their transportation along said fixed and movable rails, then move said anodes up to and on the supporting means and halt said anodes thereat; further said working means being operated for moving said supporting means and dropping the scrap anodes onto said receiving stand while maintaining their horizontal position; and still further said rotating means being operated for turning said receiving stand supporting said dropped scrap anodes through a predetermined angle, and said lifting means being operated for lowering said receiving stand by predetermined distances.

6. An apparatus as claimed in claim 5 wherein said rotating plate includes a guide plate which comprises a plate-like means mounted on a horizontal rotating shaft and provided at both ends thereof with rollers, the distance between said rotating shaft and rollers being adjustable.

7. An apparatus as claimed in claim 5 further including supporting means for supporting the barrel portion of a scrap anode disposed between said movable rails and arranged to be reciprocally movable horizontally in the moving direction of the scrap anodes.

8. An apparatus as claimed in claim 5 wherein said receiving stand includes a pair of parallel channel-like guide means each defining a central upward opening and roller conveyers disposed on said guide means in said central openings.

9. An apparatus as claimed in claim 8 wherein said crosstransferring means includes a horizontally positioned working cylinder and a pusher mounted on the head of the cylinder rod of said cylinder, and movable support means for said pusher, said support means having roller means mounted on the under surface thereof.

10. An apparatus for handling scrap anodes, each of which has a barrel, comprising:

an endless conveying means comprising a pair of upper and lower strips having projections for engaging scrap anodes disposed thereon at regular intervals, said conveying strips being disposed in parallel and at regular intervals from each other;

a pair of fixed rails disposed parallel to and under said conveying strips and along the moving direction thereof adapted to have scrap anodes hang therefrom by their upper end shoulder portions, said scrap anodes being pushed along said rails by said projection of said lower strip;

a pair of movable rails disposed following said pair of fixed rails, which movable rails are adapted to move reciprocally in a horizontal direction, which movable rails receive scrap anodes from said fixed rails, said anodes being pushed along said movable rails by said projections of said lower strip;

supporting means for supporting the barrels of the scrap anodes disposed between said movable rails, under said endless conveying strips, and designed to be reciprocally movable horizontally;

working means for moving said supporting means horizontally;

a vertically rotatable rotating plate disposed under said pair of fixed rails and connected through drive-transmitting means with said endless conveying means, said rotating plate being arranged to support the scrap anodes at their lower ends and adjust the scrap anodes to a nearly horizontal position by lifting, in proportion to their movement, the lower end of said scrap anodes, said scrap anodes each being suspended by both upper end shoulder portions thereof;

a rotatable receiving stand disposed under said supporting means and being adapted to ascend and descend between an upper no load position and a lower full load position, as well as rotate horizontally;

lifting means for causing said receiving stand to ascend and descend;

rotating means for rotating said receiving stand in a horizontal plane;

crosstransferring means located above and on one side of said receiving stand when said receiving stand is located at its lowest position and being adapted to push the scrap anodes piled on said receiving stand horizontally off of said receiving stand;

receiving means for receiving the pile of scrap anodes pushed off by said crosstransferring means on its upper surface;

weighing equipment disposed adjacent said receiving means and being adapted for weighing the pile of scrap anodes received on its upper surface from said receiving means;

transporting equipment for moving the pile of scrap anodes from said receiving means and transporting said pile onto the upper surface of said weighing equipment; and controlling means for controlling the operations of the aforesaid respective means, wherein said controlling means is so constructed that said endless conveying means and rotating plate are operated to move the scrap anodes to a substantially horizontal position during their transportation along the fixed and movable rails, then move said anodes up to and on the supporting means and halt said anodes thereat; said working means being operated for moving the supporting means and dropping the scrap anodes onto the receiving stand while maintaining their horizontal position; said rotating means being operated for turning said receiving stand supporting said dropped scrap anodes through a predetermined angle; said lifting means being operated thereby for lowering said receiving stand by a predetermined distance and halting thereat; said crosstransferring means being operated for pushing the pile of scrap anodes from said receiving stand and onto the upper surface of said receiving means; and said transporting means being operated for transporting the pile of scrap anodes from the upper surface of said receiving means onto the upper surface of said weighing equipment.

11. An apparatus as claimed in claim 10 wherein said weighing equipment includes weighing means mounted on a base, stanchions provided on said weighing means and receiving beams mounted on said stanchions.

12. An apparatus as claimed in claim 10 wherein said transporting equipment includes upper and lower double-pairs of first and second movable beams disposed horizontally and spaced-apart at regular intervals, said first movable beams being designed to move reciprocally at a slant comprising vertical motion and horizontal motion, said second movable beams being mounted on said first movable beams and designed to move only vertically when said first beams move, and capable of horizontal motion independently of the movement of said first movable beams.

13. An apparatus as claimed in claim 12 wherein said first and second movable beams each have roller means mounted on the lower surfaces thereof, said roller means of said first beams being mounted on a slanting rail provided on a base, said roller means of said second beams being mounted on horizontal rail means provided on the upper surfaces of said first movable beams, and which further includes a working cylinder for moving said first movable beams obliquely and a working cylinder for moving said second movable beams horizontally.

14. An apparatus as claimed in claim 10 wherein said rotating plate includes a guide plate which comprises a plate-like means mounted on a horizontal rotating shaft and provided at both ends thereof with rollers, the distance between said rotating shaft and rollers being adjustable.

15. An apparatus as claime in claim 10 further including supporting means for supporting the barrel portion of a scrap anode disposed between said movable rails and arranged to be reciprocally movable horizontally in the moving direction of the scrap anodes.

16. An apparatus as claimed in claim 10 wherein said receiving stand includes a pair of parallel channel-like guide means each defining a central upward opening and roller conveyers disposed on said guide means in said central openings.

17. An apparatus as claimed in claim 16 wherein said crosstransferring means includes a horizontally positioned working cylinder and a pusher mounted on the head of the cylinder rod of said cylinder, and movable support means for said pusher, said support means having roller means mounted on the under surface thereof.

* * * * *